United States Patent Office 3,406,125
Patented Oct. 15, 1968

3,406,125
ACTIVATED BAUXITE AGGREGATES AND
PREPARATION THEREOF
Aldo P. Allegrini, Westfield, and Tom A. Cecil, Highland
Park, N.J., assignors, by mesne assignments, to Engelhard Minerals & Chemicals Corporation, Menlo Park,
Edison, N.J., a corporation of Delaware
No Drawing. Continuation of application Ser. No.
360,089, Apr. 14, 1965. This application Apr. 20,
1967, Ser. No. 632,451
7 Claims. (Cl. 252—455)

ABSTRACT OF THE DISCLOSURE

Crushed bauxite ore of exceptionally high mechanical strength is produced by mixing the crushed uncalcined gibbsitic bauxite ore with a 3% to 10% dosage of sodium hydroxide in the form of a concentrated aqueous solution, extruding the mixture into pellets, reacting the sodium hydroxide with the bauxite by heating the pellets at a temperature within the range of about 250° F. to about 375° F., and then partially dehydrating the pellets at a temperature within the range of about 500° F. to about 800° F.

---

This invention has to do with the binding of ground or crushed bauxite ore into aggregates characterized by exceptionally high mechanical strength. The invention is concerned especially with an improved pelleted bauxite catalyst and its preparation from naturally occurring bauxite ore.

This application is a continuation of Ser. No. 360,089, filed Apr. 14, 1965, now abandoned.

An object of this invention is the provision of aggregates of heat activated bauxite that are mechanically stronger than activated whole bauxite ore and which also possess high surface area.

Another object is the provision of a method for bonding particulate bauxite (i.e., small bauxite granules or bauxite fines) with a caustic solution, whereby a bond of exceptional mechanical strength is realized as a result of chemical interaction between the caustic and some of the bauxite.

A specific object is the provision from bauxite ore of a pelleted catalyst of exceptional hardness or resistance to attrition.

Bauxite ores are a naturally occurring source of alumina. The ores contain one or more hydrates of alumina (frequently gibbsite, which is alpha alumina trihydrate). The ores invariably contain ferruginous and siliceous impurities, especially quartz. Typical uncalcined commercial bauxite ores analyze (dry weight basis) from about 50% to 60% by weight $Al_2O_3$, from 1% to 15% $SiO_2$, and from about 25% to 30% volatile matter (V.M.), principally water of hydration. One of the principal uses of bauxite is in the preparation of adsorbents and catalysts, especially desulfurization and isomerization catalysts. Such contact masses are produced commercially from bauxite ores by crushing and screening the whole ore to provide granules of the desired size and then calcining the granules to eliminate some of the water of hydration. Usually calcination is carried out at a calcination temperature within the range of from about 500° F. to 1200° F. and for a time sufficient to reduce the V.M. to an amount within the range of from about 1% to 12%. As a result of the dehydration, the bauxite develops a very high surface area, typically a surface area within the range of 150 to 250 m.$^2$/g., as determined by the well-known B.E.T. method. This high surface area form of bauxite is referred to as "activated bauxite."

Activated bauxite aggregates obtained by crushing and calcining whole ore, as described hereinabove, are very soft as compared with acid-activated clay and gel-type catalysts such as are used in certain hydrocarbon conversion processes. To illustrate, typical ¾ to ⅜ mesh commercial clay catalysts have a hardness of 95% to 98%, as measured by the "4 ball" test hereafter described. On the other hand, ¾ to ⅜ mesh activated bauxite catalyst obtained by calcining crushed whole ore has a hardness of only about 25% to 40% when measured by this method. As a result of this lack of hardness, a substantial proportion of activated bauxite granules breaks down into fines during shipping. These fines are useless in most commercial catalytic processes using bauxite catalysts. Consequently, an appreciable quantity of the bauxite is wasted during shipment. Additional losses may occur in the catalyst plant, especially when the catalyst is subjected to attrition during reuse and regeneration.

Many attempts have been made to produce hard aggregates of activated bauxite, either by impregnating whole crushed ore with a hardening agent or by binding a multiplicity of bauxite particles into aggregates of suitable size and shape. A wide variety of hardening reagents and binding reagents has been suggested. Exceptionally hard aggregates have been obtained by the latter procedure by using extremely finely divided bauxite in conjunction with certain alumina-reactive acidic binding ingredients. The resulting products are especially suitable for use as carriers for active catalytic materials. They leave something to be desired as active catalysts, because their surface areas are substantially less than that of activated bauxite catalysts. To illustrate, a bauxite ore which has a B.E.T. surface area of 200 m.$^2$/g. when crushed and heat activated may have a B.E.T. surface area appreciably less than 100 m.$^2$/g. when the ore is powdered and the powder pelletized with suitable alumina-reactive acid solution and then heat activated.

This invention contemplates a novel method for binding bauxite particles with caustic solution. It stems from the surprising and unexpected discovery that the bond formed by interaction of bauxite with a solution of caustic soda is extremely strong provided the bauxite is substantially fully hydrated and the reaction between the bauxite and alkali to form such bond is carried out under carefully controlled temperature conditions, as described hereinafter.

Stated briefly, in accordance with this invention, uncalcined (fully hydrated) gibbsitic bauxite particles, which may be bauxite fines or small bauxite granules, are moistened with a concentrated aqueous solution of sodium hydroxide, the solution being used in amount such as to provide from 3 to 10 parts by weight of NaOH to 100 parts by weight of bauxite ore, on a volatile free ore basis. The moistened mixture is formed into aggregates of the desired size and shape, especially by extrusion, and then the aggregates are subjected to a two-stage heating process, i.e., (1) The aggregates of bauxite particles and alkali solution are first heated to a temperature within the range of 250° F. to 375° F. for a time sufficient for the alkali to react with the hydrated bauxite.
(2) The aggregates are then activated by heating them at a temperature within the range of about 500° F. to about 800° F.

In accordance with a presently preferred form of this invention, the bauxite ore used as a starting material in the process is in the form of small granules (as opposed to a powdered ore). These granules, which are typically minus 28 or 30 mesh and substantially all plus 325 mesh, are pelletized with caustic solution by extrusion and then heat treated, initially at low temperature and subsequently at high temperature, as set forth hereinabove. The resulting product is a pelletized activated bauxite catalyst of noteworthy attrition resistance. Such result is obtained in spite of the fact that the use of the bauxite ore in the form of relatively coarse granules, rather than in the form of a fine powder, might have been expected to preclude the realization of a strong bond.

From this description of our invention, it can be seen that one essential feature resides in the use of a controlled quantity of alkali binder ingredient. When excessive alkali is used, the surface area of the finished aggregates is appreciably less than when smaller quantities of alkali are used; on the other hand, when inadequate alkali is used, the aggregates will not be sufficiently hard. Another feature, vital to the successful production of hard aggregates, is that the bond between the alkali and bauxite is a low temperature bond, obtained at a temperature well below the temperature at which the bauxite-caustic mixture is subsequently activated. When the masses are permitted to react at elevated temperatures, such as the temperatures that are suitable for the subsequent activation step, the caustic bonded product will be too soft. In fact, when reaction temperature is too high, the product may be softer than commercial bauxite granules obtained by activating whole crushed ore. These results indicate that the chemical bonds formed by reacting the alkali solution and hydrated bauxite at temperatures ranging from 250° F. to 375° F. differ fundamentally from the bond which is formed when the same ingredients react at higher temperatures. Present experience indicates that in carrying out our process the desired strong bond is a zeolite, which is a hydrated sodium aluminum silicate. It is believed that such material is formed by reaction of caustic with the alpha-alumina trihydrate (gibbsite) in the ore as well as with the silica (quartz) impurity invariably present in bauxite ores.

The bauxite ore used in the process must be a gibbsitic ore, which is to say that the ore should contain appreciable quantities of alpha-alumina trihydrate. Such ores are mined in South America, South Africa and in North America. The ore should be uncalcined (i.e., the alumina should be present in the naturally occurring trihydrate form.) However, the ore can be dried at temperatures below about 300° F. to remove all or a part of the physically held water. Analysis of typical bauxite ores are given in "Minerals for the Chemical and Allied Industries," S. J. Johnstone and M. G. Johnstone, second edition, page 6, published by John Wiley & Sons, Inc. (1961). Heat activated bauxite ore, i.e., bauxite ores calcined to a V.M. appreciably below about 25%, are unsuitable in our process since the desired hard, high surface area products are not obtained with such ores. One reason is that activated ores require large quantities of caustic in order to obtain masses of even moderate hardness; as a result of the use of large quantities of caustic, the surface area of the products is undesirably low. In the case of substantially anhydrous activated ore, e.g., ore calcined at temperatures in excess of about 1400° F. to a V.M. below 1%, the activated ore has a surface area well below 100 m.²/g. even before alkali treatment and the product will be very soft unless very large NaOH dosages are used. Thus, when a 8% NaOH dosage was employed with a minus 200 mesh sample of bauxite ore previously calcined to a V.M. of 1%, and the mixture pelleted, reacted at low temperature and then calcined at 650° F. for 2 hours to a V.M. of 4.5%, product hardness (4-ball) was only 13.4% for a 4 mesh product. Similar results were obtained with a sample of the same ore calcined at 650° F. to a V.M. of 8 to 10% before addition of the caustic. In this case, product hardness was only 9.7% when a 4% caustic dosage was used and calcination was at 650° F. for 2 hours. Product hardness was 39.5% when a 8% caustic dosage was employed with ore calcined to a 8 to 10% V.M. Surface areas were 91 m.²/g. and 140 m.²/g., respectively, with the 8% and 4% NaOH dosages and starting ore at 8 to 10% V.M. The surface area of the calcined ore before alkali treatment was 206 m.²/g.

We prefer to use whole ore that has been crushed to minus 28 mesh. A roll crusher operated at low speed is suitable for this purpose. If desired, the crushed ore can be screened, as on a 325 mesh screen, to remove fines although such step is not necessary. However, our process is also applicable to the binding of bauxite fines (e.g., bauxite that is minus 60 mesh or finer). These fines can be obtained by intentionally pulverizing the whole ore or they may be obtained as a by-product when granular grades of the ore are screened. Water-washed bauxite is suitable.

Excellent results have been realized with sodium hydroxide solutions of about 50% concentration. However, it is reasonable to expect that solutions of higher concentration, such as the 70% commercial solutions, can be used with good results. Dilute sodium hydroxide solutions, such as solutions of 25% concentration, do not appear to give as good results as more concentrated solutions in spite of the fact that our mixtures of bauxite particles and alkali solution may be diluted subsequently with water to impart sufficient workability to permit particle formation by means such as extrusion.

As mentioned hereinabove, we use sufficient caustic solution to provide from 3 to 10 parts by weight NaOH per 100 parts by weight of volatile free bauxite. In other words, we use a 3% to 10% weight dosage of NaOH. When NaOH dosage is too low, the resulting aggregates are too soft. On the other hand, when NaOH dosage is too high, the surface area of the product is too low. Optimum dosage will vary somewhat with ores of different origin and can be readily determined by simple experimentation. To realize satisfactory hardness coupled with desirable high surface area, we prefer to use a NaOH dosage within the limits of about 4% to 6% with most ores.

It may be necessary to add water to the mixture of bauxite and aqueous caustic solution to make the mixture sufficiently plastic for particle formation. This is especially the case when low caustic dosages are employed. The quantity of water we add will vary with the following: the particle size of the ore, the total volume of alkali solution (i.e., alkali dosage and solution concentration), the quantity of moisture in the starting ore and the method of agglomerating the mixture.

The bauxite can be mixed with the alkali solution and water in a pug mill or cement mixer. The addition of caustic solution to the bauxite particles imparts desirable plasticity to the bauxite. Therefore, the causticized bauxite particles can be formed into pelleted aggregates by extrusion. Without caustic treatment, the bauxite is not amenable to the formation of pellets by extrusion since the ore lacks the required plasticity. Auger extruders or piston-type extruders can be used in pelletizing the caustic treated bauxite. In carrying out the preferred form of our invention wherein coarse granules of bauxite ore are pelletized by extrusion with alkali solution, we prefer to extrude our alkali treated bauxite mixture through a fairly large die, e.g., a die having a ⅜" hole. When granulated ore is pelletized in such manner, the pellets are usually appreciably harder, all other variables being constant, than when smaller pellets, e.g., ¹⁄₁₆" pellets, are produced. After extrusion, the pellets, which are in the form of short cylinders, can be rounded by mild shaking until the corners of the pellets are deformed.

Other forming procedures, such as, for example, pan-granulation and tabletting can be used.

The initial heating of the aggregates can be carried out in ovens or dryers of various designs. These ovens or dryers can be directly or indirectly heated. At the low temperatures used at this stage of the heating cycle, little if any water of hydration is removed from the bauxite and the reaction between the bauxite and alkali solution can be carried out in a closed or in a vented oven. The aggregates should be held at a product temperature within the range of 250° F. to 375° F. for at least about ¼ hour. We prefer to heat the aggregates for a time within the range of about ½ hour to 2 hours. Considerably longer heating times, such as 8 hours, can be used. However, there is no especial advantage in heating the particles for more than about two hours. At temperatures appreciably below 250° F. excessive heating times may be required. At temperatures above 375° F., the desired product hardness is not realized. We prefer to carry out the heating step at about 275° F. to 300° F. for about 45 minutes to 1½ hours. Unless an unusually large proportion of water has been added to the bauxite particles and alkali before the forming step, the reacted pellets will be extremely hard at this stage of the process. In fact, they may be as hard as or even harder than the ultimate heat-activated aggregates.

The second stage of heating—the activation step—should be carried out in vented calcination equipment provided with internal or external means for heating the reacted aggregates to a temperature within the range of about 500° F. to about 800° F., preferably 650° F. to 700° F. At temperatures appreciably below 500° F. the required activation of the bauxite will not take place. At temperatures appreciably above 800° F., the surface area and hardness will be adversely affected. Provided the reactor used in the first heating stage is provided with vents, the same equipment can be used in the second stage of heating. Calcination time, which will vary with calcination temperature and with the nature of the calcination equipment, should be sufficient to reduce the volatile matter of the aggregates to a value within the range of 6% to 12%. Optimum volatile matter of the activated masses to realize maximum hardness is usually within the range of 8% to 11%. Those familiar with the characteristics of bauxite contact masses will recognize that the 8% to 11% volatile matter content of the preferred activated bauxite aggregates of this invention is higher than the optimum volatile matter of conventional activated bauxite masses. This may be explained by the fact that the postulated zeolite bond loses its strength when it is dehydrated.

The caustic bonded activated bauxite product of this invention is especially suitable for use of a desulfurization catalyst. It can also be used as a carrier for an active catalytic material such as, for example, chromia; as a refining or decolorizing agent for oil, fats or waxes; as a dehumidifying agent for gas and vapors; as a dehydrating agent for organic fluids. The product has a 4-ball hardness value (defined hereinafter) that may be twice as great as the hardness value of activated whole bauxite ore of the same mesh size and similar volatile matter content. The B.E.T. surface area of products of this invention are in excess of 100 m.$^2$/g. and may be as high as 150 m.$^2$/g. or more.

The following examples are given to contribute to a fuller understanding of our invention and to illustrate certain critical features thereof.

In the examples, all proportions are reported on a weight basis and mesh sizes refer to values obtained with Tyler screen-scale sieves. Hardness values all refer to values obtained by the so-called "4-ball" test method, which is described in U.S. Patent No. 3,078,518 to Alfred J. Robinson and Walter L. Haden, Jr. In the hardness testing, when plus 3 mesh samples were used a 4 mesh limiting screen was employed. With 8 mesh samples, a 10 mesh screen was used.

The term "B.E.T. surface area," used herein refers to values determined by the method described in the article by Brunauer, Emmett and Teller appearing in J. Am. Chem. Soc. 60, 309 to 319 (1938), using molecular size data for nitrogen suggested by H. K. Livingston in J. Colloid Sci., 4, 447/458 (1949).

The term "volatile matter" (V.M.) refers to the weight percentage of a material that is eliminated when the material is heated to essentially constant weight at 1800° F. In the case of bauxite ore, water accounts for substantially all volatile matter. "Free moisture" (F.M.) refers to the weight percentage of a material that is lost when the material is heated to essentially constant weight at 225° F.

EXAMPLE I

A pelleted catalyst of this invention was produced from Surinam bauxite ore in the following manner. The ore was crushed to 100% minus 28 mesh in a roll crusher operating at low speed. The minus 325 mesh content of the crushed ore was about 5% by weight. Forty-five pounds of ore, containing 31% by weight volatile matter, was placed in a pug mill. 2000 grams of a 50% solution of sodium hydroxide was added at room temperature to the pug mill over a period of 10 minutes to provide 7 pounds NaOH per 100 pounds volatile free ore. After addition of the solution was completed, pugging was continued for an additional 40 minutes. The temperature of the pugged mixture was 105° F. This mixture was pugged in a Welding Engineer's Extruder through a die plate having a ⅜" land and 3/16" holes. The resulting pellets were placed in a forced draft oven that was maintained at 300° F. The residence time of the pellets in the oven was 2 hours. The pellets were then placed in a rotary dryer in which the pellets were heated for 30 minutes until product temperature was 700° F. The pellets were maintained at 700° F. for 1 hour. The V.M. of the calcined pellets was 9.2%.

The product had a satisfactory B.E.T. surface area of 124 m.$^2$/g. and an excellent 4-ball hardness of 91% for a plus 4 mesh sample, as compared with the 223 m.$^2$/g. surface area and 17% hardness for plus 4 mesh whole Surinam ore after being granulated and activated at 650° F.

EXAMPLE II

This example illustrates the formation of a hard pelleted activated bauxite catalyst from a typical Arkansas bauxite ore.

Forty-five pounds of minus 35 mesh Heckler bauxite ore at 22.6% V.M. was mixed for 10 minutes in a pug mill with 1580 grams of a 50% solution of sodium hydroxide, to provide 5 pounds of NaOH per 100 pounds of volatile free ore. 3800 milliliters of water was added with plugging over a period of 5 minutes. The mixture was pugged for an additional 30 minutes after addition of water was completed and then extruded through a double worm extruder having about ⅜" holes and a ½" land. The extrudate was cut into pellets as it emerged from the die plate and the pellets were discharged directly into a vibrating box to round the edges of the pellets. The pellets were reacted in a rotary dryer at a product temperature of 280° F. for 45 minutes. The V.M. of the reacted pellets was 25.5% and F.M. was 2.4%. The reacted pellets were then activated by calcination in a 650° F. muffle furnace for 2 hours. The V.M. of the activated pellets was 7.8% and 4-ball hardness was 92.7% for the plus 4 mesh fraction of the pellets.

When the NaOH dosage was decreased to 2% with this particular ore, extremely soft pellets having a hardness of only 2% resulted. With a 7.2% NaOH dosage, pellets of 98% hardness were produced.

EXAMPLE III

This example illustrates the necessity for reacting the alkali with bauxite at a temperature below 400° F.

To 45 pounds of minus 28 mesh uncalcined Surinam bauxite ore (24.9% V.M.) in a pug mill, 2000 grams of a 50% NaOH solution was added with pugging over a 13 minute period. After all of the solution had been added, pugging was continued for 20 minutes more. 2450 milliliters of water was gradually added to the contents of the pug mill over a period of 10 minutes and the mass pugged for an additional 10 minutes. The mixture was extruded in a screw-type extruder through a die having 3/16" holes. Samples of the pellets were heated in an externally heated rotary dryer to pellet temperatures ranging from 300° F. to 600° F. over a period of one hour and maintained at such temperature for 45 minutes. The pellets were then heated in an indirectly fired calciner for 45 minutes at 700° F. to activate the bauxite. The hardness of the plus 4 mesh fraction of each product was measured, with the results summarized in the following table.

EFFECT OF REACTION TEMPERATURE ON THE HARDNESS OF PELLETS FORMED FROM GROUND BAUXITE PELLETIZED WITH CAUSTIC SODA

| Reaction temperature, °F. | V.M. of reacted pellets, percent | Hardness of 700° F. activated pellets, percent |
| --- | --- | --- |
| 300 | 36.9 | 72 |
| 350 | 34.3 | 70 |
| 400 | 25.1 | 54 |
| 450 | 24.8 | 42 |
| 500 | 22.2 | 29 |
| 600 | 12.9 | 22 |
| 650 | 8.6 | 33 |

These data show that at reaction temperatures appreciably above 350° F., pellet hardness decreased sharply. These data indicate that temperatures suitable for pellet activation, i.e., 500° F. to 600° F., were completely unsuitable for the reaction step. These data therefore demonstrate the necessity for an initial low-stage reaction before heat activation in the production of attrition resistant caustic bonded bauxite particles.

EXAMPLE IV

This example illustrates the formation of mechanically strong high surface area catalyst pellets from bauxite fines.

Surinam bauxite ore at 31% V.M. was ground to 100% minus 200 mesh. Twenty-five pounds of the 200 mesh ore was placed in a pug mill and 940 grams of 50% NaOH solution (6.0% dosage) was gradually dripped onto the fines over a 10 minute period. After addition of caustic solution was completed, the fines were pugged for 10 minutes. 900 milliliters of water was added to the charge over a period of 10 minutes while the pugger was in operation. Pugging was continued for an additional 50 minute period. The pug mill was discharged and the mixture extruded in a screw-type extruder through a die having 1/16" holes and 1/2" land. The extrudate was heated in a forced draft oven at 300° F. for 2 hours and then calcined in a muffle furnace at 700° F. for 2 hours. The hardness of the plus 10 mesh fraction of the catalyst pellets was 95%.

When the process was repeated with the NaOH dosage increased to 12%, pellet hardness was only 20%.

We claim:

1. A method for forming mechanically strong pellets of activated bauxite which comprises:
   (1) mixing particles of hydrated gibbsitic bauxite ore with a 3% to 10% dosage of sodium hydroxide in the form of an aqueous solution thereof to form a mass,
   (2) extruding said mass to form pellets,
   (3) heating said pellets at a temperature within the range of about 250° F. to about 375° F. for a time sufficient for hydrated gibbsite in said pellets to react with said sodium hydroxide solution,
   (4) and activating said aggregates by partially dehydrating them at a temperature within the range of from about 500° F. to about 800° F.

2. The method of claim 1 wherein said particles of bauxite ore consist predominantly of small granules within the range of 28 to 325 mesh.

3. The method of claim 1 wherein said pellets are heated at said temperature within the range of from about 250° F. to 375° F. for at least 15 minutes.

4. The method of claim 1 wherein said pellets are heated at said temperature within the range of from about 250° F. to 375° F. for a time within the range of 15 minutes to 8 hours.

5. The method of claim 1 wherein said pellets are activated by heating them at a temperature within the range of from about 600° F. to about 700° F.

6. A method for forming mechanically strong pellets of activated bauxite which comprises:
   (1) providing uncalcined hydrated bauxite ore substantially all of which is in the form of granules finer than about 30 mesh and coarser than about 325 mesh,
   (2) mixing the crushed uncalcined ore with about a 4% to 6% dosage of sodium hydroxide in the form of an aqueous solution of at least about 50% concentration,
   (3) adjusting the volatile matter of the mixture to form a mass of extrudable consistency by addition of water,
   (4) extruding said mass to form cylindrical pellets,
   (5) heating said pellets at a temperature within the range of from about 275° F. to about 375° F. for a time within the range of about 1/2 hour to 2 hours,
   (6) and activating said pellets by heating them at a temperature within the range of from about 500° F. to about 800° F.

7. The product of claim 1.

References Cited

UNITED STATES PATENTS

| | | | |
| --- | --- | --- | --- |
| 3,065,054 | 11/1962 | Haden et al. | 252—455 |
| 3,222,297 | 12/1965 | Allegrini et al. | 252—463 X |
| 3,228,891 | 1/1966 | Duke | 252—463 X |

PATRICK P. GARVIN, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,125  
October 15, 1968

Aldo P. Allegrini et al.

It is certified that error appears in the above identified patent and that said Letters Patent are hereby corrected as shown below:

Column 4, line 11, "the whole are or" should read -- the whole ore or --; line 63, "e.g., 1/16" should read -- e.g., 5/16 --.

Signed and sealed this 3rd day of March 1970.

(SEAL)  
Attest:

Edward M. Fletcher, Jr.  
Attesting Officer

WILLIAM E. SCHUYLER, JR.  
Commissioner of Patents